United States Patent
Leung et al.

[11] Patent Number: 5,982,742
[45] Date of Patent: Nov. 9, 1999

[54] MULTIPLE ACCESS SIMPLEX MODE COMMUNICATION SYSTEMS AND METHODS THEREFOR

[75] Inventors: Tai-che Leung; Kwok-viu Leung; Chi-keung Tang; Moun-lun Tai; Ming-lam Ng, all of Hong Kong, The Hong Kong Special Administrative Region of the People's Republic of China

[73] Assignee: Telecom Technology Centre Company Limited, Yau Yat Chuen, The Hong Kong Special Administrative Region of the People's Republic of China

[21] Appl. No.: 08/985,857

[22] Filed: Dec. 5, 1997

[51] Int. Cl.⁶ .................................................. H04J 3/10
[52] U.S. Cl. ...................... 370/213; 340/825.04; 370/345
[58] Field of Search ................... 340/825.04, 825.53, 340/825.63; 370/213, 201, 432, 449, 326, 336, 345, 205; 359/142, 148; 375/200

[56] References Cited

U.S. PATENT DOCUMENTS

| | | |
|---|---|---|
| 4,748,446 | 5/1988 | Hayworth . |
| 4,931,790 | 6/1990 | Kobayashi et al. . |
| 5,331,450 | 7/1994 | Heep et al. . |
| 5,663,716 | 9/1997 | Miwa et al. . |
| 5,870,381 | 2/1999 | Kawasaki et al. . |

*Primary Examiner*—Chau Nguyen
*Assistant Examiner*—Kenneth Vanderpuye
*Attorney, Agent, or Firm*—Alix, Yale & Ristas, LLP

[57] ABSTRACT

An asynchronous time-hopping multiple access "(ATHMA)" protocol and a simplex mode communication system utilizing the same requires no synchronization between transmitting stations, no handshaking between transmitters and receivers and no system manager to coordinate data message transmission. The ATHMA protocol ensures that for an n-channel asynchronous simplex mode communication system, each transmitter repeatedly sends each unique data message n successive times according to its own time-hopping schedule. In the preferred embodiment the time-hopping schedules are coordinated such that at least one duplication of each unique message will not collide with any other messages over a given period. Thus, at most n−1 transmissions out of the total n transmissions of each unique data message will be collided and lost. The ATHMA protocol and communication system of the present invention is ideally suited for applications requiring a low throughput rate and channel capacity. The ATHMA protocol can be applied to various transmissions media such as radio, infrared optics and wired media with little or no modification.

6 Claims, 6 Drawing Sheets

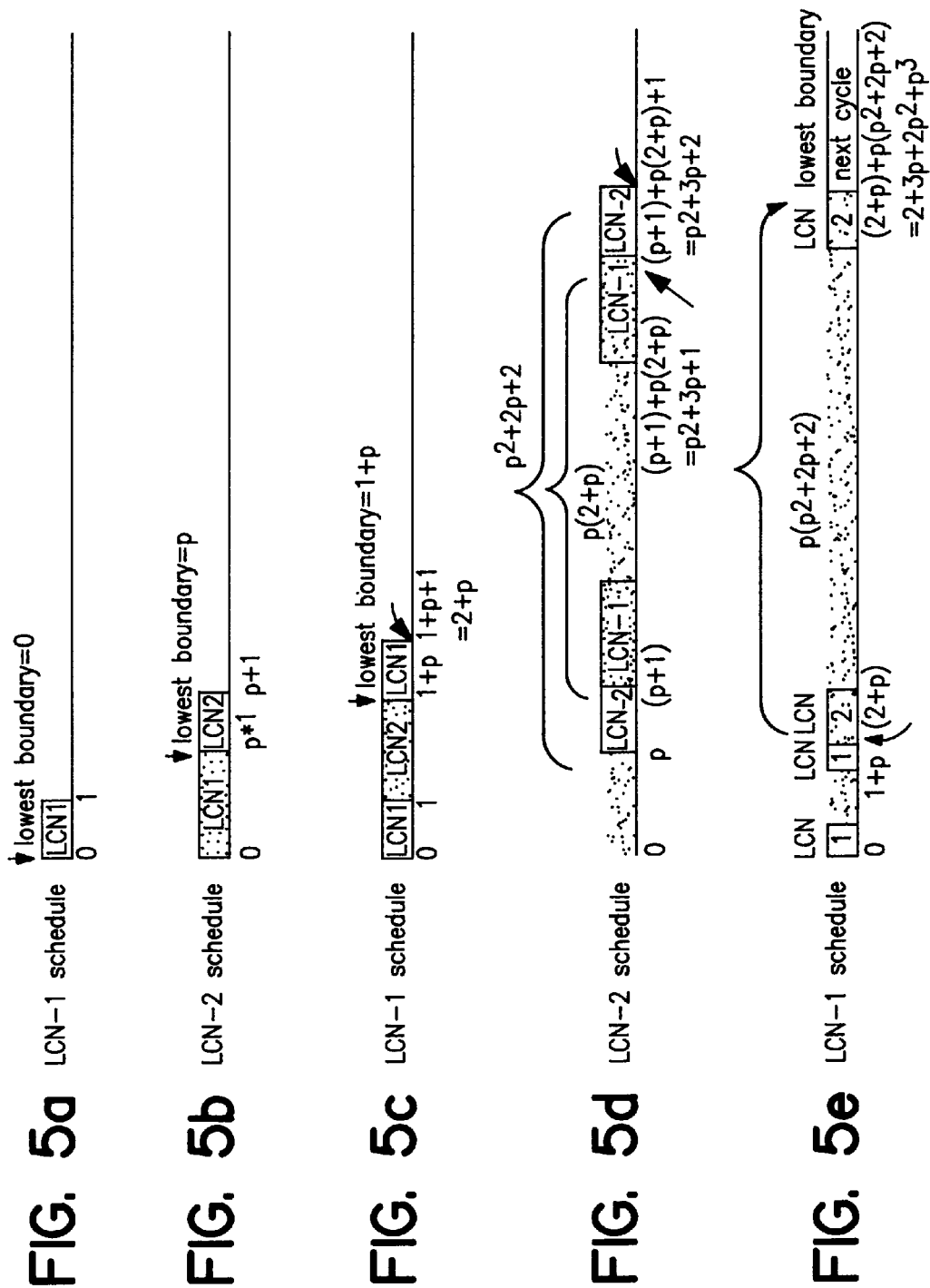

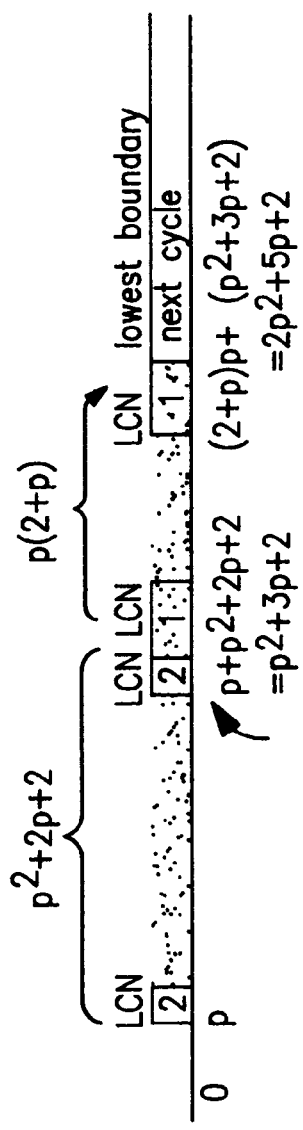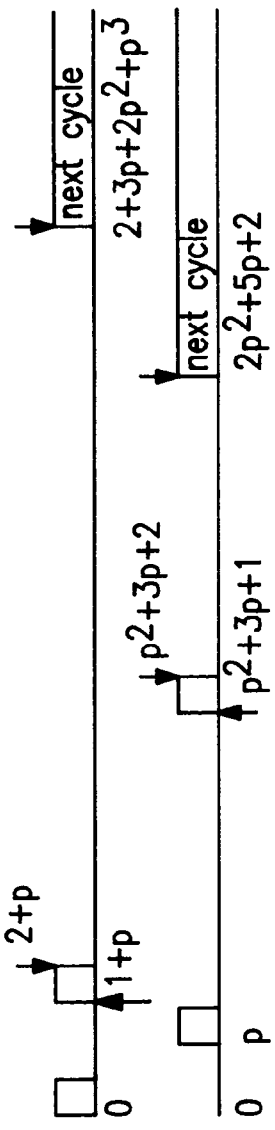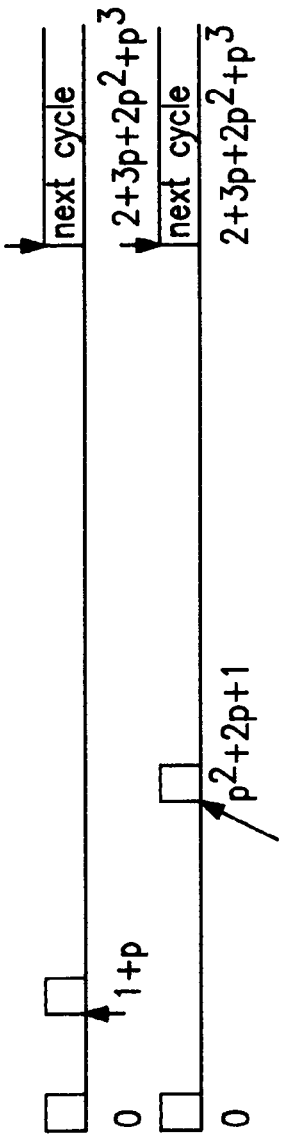
FIG. 5f
FIG. 5g
FIG. 5h
FIG. 5i
FIG. 5j

MULTIPLE ACCESS SIMPLEX MODE COMMUNICATION SYSTEMS AND METHODS THEREFOR

BACKGROUND OF THE INVENTION

1. Field of the Invention

The present invention generally relates to the field of multiple access communications systems. More particularly, the present invention is directed to asynchronous multiple access simplex mode communications systems and methods therefor. Accordingly, the general objects of the present invention are to provide novel and improved methods and apparatus of such character.

2. Description of the Related Art

In simplex mode communication systems of the related art, information can be transferred in only one direction, i.e. from one or more transmitters to one or more receivers. Some examples of such simplex mode communications systems include radio-controlled toy cars, remote data-collection systems and remote-controlled joysticks. In applications such as these, where multiple transmitters may be attempting to communicate with one of a plurality of receivers within close proximity to one another, differentiation between the various transmitter signals at the receivers is necessary to avoid signal collision and loss. Such differentiation has conventionally been accomplished, for example, by frequency division multiple access schemes wherein each transmitter/receiver pair is assigned a unique communication channel of a particular frequency band. Dividing the frequency spectrum in this manner reduces the possibility of signal confusion when two or more transmitter/receiver pairs are utilized in close proximity to each other and share a common transmission medium.

However, among other things, such frequency division multiple access schemes suffer from the deficiency that unique electronic circuitry, corresponding to the unique frequency band for each product, must be employed in each product in order to allow the products to operate at different frequencies. Naturally, this increases the cost of such products and complicates the manufacturing process by unnecessarily complicating inventory control and production flow during manufacturing, etc. Furthermore, when such products are mass produced it is simply impossible to ensure that a unique communication channel has been assigned to every one of the products because of the limited frequency range which has been allocated to such uses. Accordingly, while steps can be taken to minimize the risk of signal confusion, some frequency channel duplication inevitably occurs. Naturally, this gives rise to the possibility that users of a given product will interfere with one another. All of these deficiencies limit the use of frequency division multiple access schemes in simplex mode communication systems.

In contexts other than simplex mode communication systems time division multiple access schemes have also been employed with some degree of success. Time division multiple access schemes are often used in conjunction with frequency division multiple access schemes to further reduce the possibility of conflicts between users of a given product. Time division multiple access schemes, however, avoid some of the above-described deficiencies of frequency division multiple access schemes by ensuring that transmitted messages are separated in time. Restated, time division multiple access schemes allow multiple transmitter/receiver pairs to utilize unique time slots for the transfer of information, even if the transmitter/receiver pairs operate in the same frequency band.

Some of the time division schemes currently in use include time division multiple access ("TDMA"), ALOHA (either pure or slotted) and carrier-sense multiple access with collision-detection ("CSMA/CD"). Each of the schemes has a number of variations. However, all of these multiple access schemes have proven to be difficult and costly, and in some cases impossible, to implement in simplex mode communication systems. For example, TDMA allows for communication between multiple transmitter/receivers over a shared frequency band of a transmission medium by allocating synchronized time frames to each of the transmitter/receiver pairs. Thus, in a TDMA system, a given time frame is divided into individual time-slots and each transmitter is pre-assigned unique time-slots in which to transmit information to its receiver. However, it is necessary for the various receivers and transmitters of the system to be synchronized with one another for the system to operate effectively. Thus, TDMA requires a centralized system manager to pre-assign time-slots, communicate those assignments to the various transmitter/receivers and monitor the synchronization between the various components of the system during operation. This, naturally, leads to an undesirable increase in network complexity and expense. Alternatively, known handshaking techniques can be used to coordinate message transmission between transmitter/receiver pairs. However, such a system cannot be implemented in a simplex mode communication system because it requires the transfer of information between transmitter/receiver pairs in both directions.

A pure ALOHA multiple access protocol avoids the need for a system manager by allowing transmitters to transfer information to respective receivers at random times regardless of whether or not other transmitters are attempting to do the same. Using ALOHA, however, each transmitter must monitor the transmission medium for signal collisions between its own signal transmissions and signal transmissions from other transmitters. When such collisions occur, the transmitters must wait a random period of time and retransmit the collided messages while, again, monitoring the transmission medium for another signal collision. This process is repeated until transmission of the messages is successfully completed, i.e. no collision between these messages and any other messages occurs. However, since the pure ALOHA protocol does not even attempt to avoid signal collisions, there is no guarantee that any given signal will be successfully transmitted. Further, the pure ALOHA protocol suffers from the deficiencies of low throughput rates and instability. To overcome these deficiencies a variation of the pure ALOHA protocol known as slotted ALOHA has been developed. However, the slotted ALOHA protocol cannot be implemented in an asynchronous simplex mode communication system because the receivers of a slotted ALOHA system must send message-reception acknowledgments to the transmitters (i.e., handshaking) and because the transmitters must be synchronized with one another.

Yet another attempt to improve the related art time division multiple access schemes is CSMA/CD. CSMA/CD attempts to avoid signal collisions by allowing transmitters to transmit data messages only after monitoring the transmission medium to ensure that the transmission medium is not currently in use by another transmitter. If the transmission medium is in use, the transmitter must wait until the transmission medium is clear before transmitting a message. However, one major deficiency of CSMA/CD systems is that, between the time that a transmitter finishes checking whether the transmission medium is free, and the time that it begins transmitting, another transmitter can begin transmitting another message. The result is a collision of the two transmitted signals. If such a collision occurs, the transmitters broadcasting the colliding signals stop transmitting immediately and wait a random time period before attempting retransmission. This process is repeated until both of the transmissions are successfully completed. One of the primary deficiencies of the CSMA/CD protocol is that the signal-collision detection and back-off algorithms utilized to effectuate signal transmissions necessarily results in a significant increase in the cost and hardware complexity of the system. Additionally, the various transmitters of a given system must be synchronized with one another to operate effectively.

Therefore, there remains a need in the art for a multiple access protocol for use in simplex communication systems which overcomes the aforementioned deficiencies of the related art by dispensing with the need for synchronization between the transmitters of a multiple-transmitter system while guaranteeing successful reception of all transmitted data messages.

There remains an additional need in the art for a multiple access protocol for use in simplex mode communication systems which overcomes the aforementioned deficiencies of the related art by avoiding the need to synchronize the various components of the system while reducing the complexity of the hardware needed to implement the protocol.

There remains a further need in the art for a multiple-access protocol for use with simplex mode communication systems which overcomes the aforementioned deficiencies of the prior art by accommodating a significant number of transmitter/receiver pairs on a single frequency band while offering a significant throughput rate and eliminating the possibility of signal collision among the various transmitters of the system.

SUMMARY OF THE INVENTION

It is accordingly an object of the present invention to provide an improved multiple access protocol for use with asynchronous simplex mode communication systems which can accommodate a significant number of independent signals into a single frequency band, offer a significant throughput rate and guarantee successful transmission of all signals.

It is a further object of the present invention to provide an improved multiple access protocol for use with asynchronous simplex mode communication systems which minimizes the cost and complexity of the hardware necessary to implement the protocol.

It is yet another object of the present invention to provide an asynchronous multiple access protocol for use with asynchronous simplex mode communication systems which offers an optimal combination of (1) simplicity; (2) reliability; (3) efficiency; and (4) versatility.

These and other objects and advantages of the present invention are provided in one embodiment by providing an asynchronous time-hopping multiple access ("ATHMA") protocol which requires no synchronization between transmitting stations, no handshaking between transmitters and receivers and no system manager to coordinate data message transmission. Provided that the burstiness of message transmission for a particular system is known, the ATHMA protocol of the present invention can be optimized for any number of channels without raising the possibility of losing messages due to signal collisions. Conversely, the ATHMA protocol of the present invention can be optimized for a given number of channels, in which case the burstiness of message transmission is dictated by the system design, while still guaranteeing successful message transmission and reception. The ATHMA protocol of the present invention is ideally suited for applications only requiring a low throughput rate and channel capacity. It can be applied to various transmission media such as radio, infrared optics and wired media with little or no modification.

In the ATHMA protocol of the present invention the number of channels is defined by the number of transmitters utilized in the system. The inventive ATHMA protocol ensures that for an n-channel asynchronous simplex mode communication system, each transmitter repeatedly sends each unique data message n successive times according to its own unique and predetermined time-hopping schedule. The time-hopping schedules followed by the transmitters are coordinated such that they guarantee that at least one repetition of each unique message will not collide with any other messages over a given period. In other words, at most n−1 transmissions out of the total n transmissions of each unique data message will be collided and lost. Thus, the set of time-hopping schedules utilized by the transmitters are predetermined to ensure that at least one of the repeated messages for each period (in the case of periodic systems) will be successfully transmitted to the desired receiver. While the time-hopping schedules utilized are preferably periodic, the present invention is not so limited. The particular time-hopping schedule utilized in any given case is dictated by the number of channels to be accommodated, the burstiness of message transmission of the various transmitters and the throughput rate of the system. Further, the particular time-hopping schedule utilized by a given transmitter can be optimized by using a time domain boundary method ("TDBM") to calculate the time-hopping schedules.

Utilizing the ATHMA protocol of the present invention in a simplex mode communication system results in an effective system which can be implemented with relatively simple hardware, is asynchronous, guarantees successful message transmission, avoids the need to use a system manager and does not utilize transmitter/receiver handshaking.

Numerous other advantages and features of the present invention will become apparent to those of ordinary skill in the art from the following detailed description of the invention, from the claims, and from the accompanying drawings.

BRIEF DESCRIPTION OF THE DRAWINGS

The preferred embodiment of the present invention will be described below with reference to the accompanying drawings wherein like numerals represent like structures and wherein:

FIGS. 5a–5j illustrate the time domain boundary method of selecting time-hopping schedules of the ATHMA protocol for use in the system of FIG. 1;

DESCRIPTION OF THE PREFERRED EMBODIMENTS

Figure 1:
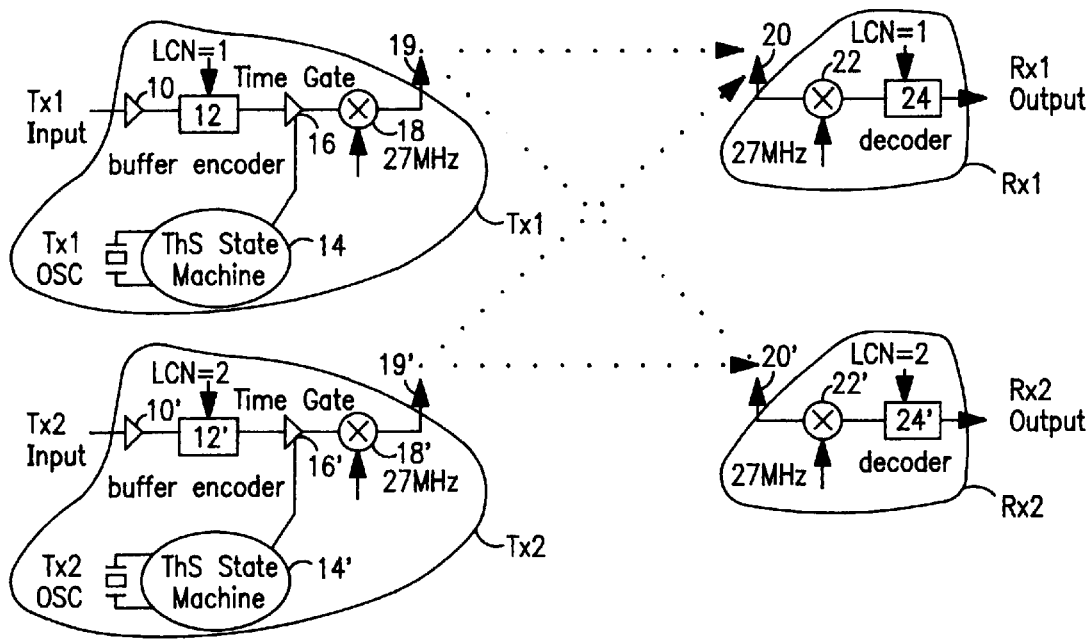
FIG. 1 is a schematic representation of a two channel simplex mode communication system utilizing the ATHMA protocol of the present invention as a media access control ("MAC") protocol.

Preferred embodiments of the inventive ATHMA protocol and the asynchronous simplex mode communication system of the present invention will be described below with primary reference to FIGS. 1–4. Those of ordinary skill in the art will readily appreciate that the simplex mode communication system of FIG. 1 could represent, for example, two radio-controlled toy cars operated in proximity to one another. Other applications for the embodiment of FIG. 1 include wireless doorbells, security systems and remote controllers for home electronic devices, etc. As shown in FIG. 1, the simplex mode communication system includes first and second transmitters Tx1 and Tx2, respectively, both of which transmit signals superimposed on a carrier frequency of 27 MHZ to first and second receivers Rx1 and Rx2, respectively. Receivers Rx1 and Rx2 each receive signals from both of transmitters Tx1 and Tx2. Transmitters Tx1 and Tx2 respectively include buffers 10, 10', encoders 12, 12', time-hopping schedule state machines 14, 14', time gates 16, 16', modulators 18, 18' and antennas 19, 19'.

Data to be transmitted to receivers Rx1 and Rx2 is first inputted into buffers 10, 10' and then passed to encoders 12, 12' for packing and encoding the input data into data messages of a desired format. For example, the input data is preferably packed together with a logical channel number ("LCN") and other message overheads in the following format: start-bits+LCN+input data+parity+stop-bits and then encoded using Manchester coding or another encoding scheme known in the art. In the case of radio-controlled toy cars, the input could be generated by movement of a joystick at the hand-held transmitter. Other methods, however, are also well known in the art. The packing and encoding are preferably identical in both first and second transmitters Tx1 and Tx2 except for the fact that transmitter/receiver pair Tx1/Rx1 is assigned a logical channel number of 1 and the transmitter/receiver pair Tx2/Rx2 is assigned a logical channel number of 2.

After the input data is properly encoded and packed into a data message, the data message is passed to time gates 16, 16'. Time gates 16, 16' are controlled by time-hopping schedule state machines 14, 14' which each have asynchronous local oscillator clocks 15, 15' respectively. Furthermore, each of the time-hopping state machines 14, 14' are preferably preprogrammed with their own periodic time-hopping schedules, such schedules being coordinated to ensure that time gates 16, 16' are each opened at least once during each period when the other of time gates 16, 16' is closed. More generally stated, each transmitter is coordinated to send each message at least one time when all other transmitters are inactive. Preferably, time gates 16 and 16' are opened twice per period. When time gates 16, 16' open, the data messages pass to modulators 18, 18', where it is modulated at 27 MHZ and transmitted from antennae 19, 19'. Conversely, when time gates 16, 16' are closed, the data messages are blocked from modulation and transmission.

The cooperation of each of the time-hopping schedule state machines and time gates, thus, ensures that for every two successive data message transmissions, at most, only one transmission will collide with another transmission. Restated, the schedules ensure that at least one duplication of each data message will reach receivers Rx1 and Rx2 intact. Taking one simple example, if the time-hopping schedules utilized by Tx1 and Tx2 both have a period of 12.5 generic or normalized time units and the length of each data message to be transmitted is one time unit, the time gate 16 of transmitter Tx1 could periodically open at 1 and 6.25 time units and close at 2 and 7.25 time units. Time gate 16' of transmitter Tx2 could be scheduled to periodically open at 1 and 2.375 time units and close at 2 and 3.375 time units. Utilizing these time-hopping schedules ensures that no signal collisions will occur.

In the system of FIG. 1, there are three possible outcomes each time a data message is transmitted from at least one of Tx1 and Tx2. First, receivers Rx1 and Rx2 may receive an uncollided data message from transmitter Tx1. Second, receivers Rx1 and Rx2 may receive an uncollided data message from transmitter Tx2. Finally, receivers Rx1 and Rx2 may receive a combined, i.e., collided, data message from both of transmitters Tx1 and Tx2. These three possible outcomes are illustrated in various portions of FIGS. 2a–2g. To distinguish between the three possible outcomes, receivers Rx1 and Rx2 preferably examine any signals received for the error checking or parity bits. If the parity bits indicate that an error, such as a collision, has occurred, both receivers R1 and Rx2 discard the signal and await further data messages. Signal collision can also be detected based on an inability of the receiver to demodulate the signal. For example, if a message is coded in Manchester coding, a collided message may be identified as an exclusion. If no error in transmission has occurred, each of receivers Rx1 and Rx2 determines whether the uncollided data message received has a logical channel number which indicates that the signal should be accepted, i.e. is intended for reception by that receiver. If so, the appropriate receiver extracts the input data from the data message and outputs the data for use with some device attached thereto. In the event that several duplicate data messages within a given period are successfully transmitted, receivers Rx1 and Rx2 preferably simply ignore the subsequent repetitions of the data message. To assist in this process, each encoded data message may, optionally, include a signal sequence number packed as one of the overheads wherein the sequence number is indicative of the number of times a given data message has been repeated.

Receivers Rx1 and Rx2 respectively include antennae 20, 20', demodulators 22, 22', and decoders 24, 24'. Preferably, decoder 24 of Rx1 is preprogrammed to recognize data messages bearing logical channel number 1 and decoder 24' of Rx2 is preprogrammed to recognize data messages bearing logical channel number 2. Data messages received at antennae 20, 20' are passed through demodulators 22, 20' to remove the carrier frequency therefrom and are then passed to decoders 24, 24. In other words, the input data is extracted from the data messages. In the event that the data messages bearing the appropriate logical channel number have not collided with any other data messages, the extracted data is passed from decoders 24, 24' and outputted from receiver Rx1 and Rx2 for use with some device attached thereto. Otherwise, the data is discarded.

The simplex mode communications systems of the type discussed above can be implemented with a number of alternatives. For example, time-hopping schedule state machines 14, 14' can be imbedded in the encoders 12, 12'. Additionally, time gates 16, 16' of transmitters Tx1 and Tx2 could be located downstream of modulators 18, 18'.

Naturally, the simplex mode communication system discussed above could be readily adapted to a system accommodating three or more transmitter/receiver pairs by merely assigning additional logical channel numbers and modifying the set of time-hopping schedules employed by the state machines 14, 14' and the state machines of any additional transmitters.

FIGS. 2a–2g illustrate one possible scheme for data message transmission in the simplex mode communication system of FIG. 1. In this hypothetical example, transmitters Tx1 and Tx2 utilize time-hopping schedules which have a period of eight generic or normalized time units. Further, transmitter Tx1 allocates one generic time unit for each signal transmission and schedules data message transmissions to commence at times 1 and 3. Transmitter Tx2 allocates one generic time unit for each data message transmission and schedules data message signal transmissions to commence at times 1 and 5. Since first and second transmitters Tx1 and Tx2 are asynchronous, however, the signal transmission times are relative to one another. Thus, the period of the time-hopping schedule utilized by Tx1 could begin at any time relative to the period of the time-hopping schedule utilized by Tx2. To account for this possibility, the transmission times for second transmitter Tx2 have been shifted relative to one another throughout FIGS. 2a–2g, each time shift being one half a time unit per figure. Thus, taken collectively FIGS. 2a–2g illustrate all of the possible signal transmission outcomes for the simplex mode communication system of FIG. 1. For each case, the combined signal transmission result is illustrated, i.e., whether or not the data messages collide with one another or pass to the respective receivers Rx1 and Rx2 intact. As shown in FIGS. 2a–2g, each transmitter Tx1 and Tx2 transmits the identical desired data message twice within each period. It will be appreciated that, despite the fact that transmitters Tx1 and Tx2 are not in coordination with each other, the cooperation between the time-hopping schedules utilized guarantees that at least one duplication of each data message is not collided with any other signals. It will also be appreciated that this is true regardless of when transmitters Tx1 and Tx2 start their time-hopping schedules.

Since the simplex mode communication system of FIG. 1 is a two-channel system, the ATHMA protocol of the present invention dictates each data message transmission be duplicated twice per period, i.e., two transmissions per period. This is a consequence of the fact that there are only two possibilities of contention between signals transmitted from transmitters Tx1 and Tx2. Thus, from the perspective of transmitter Tx1, signals transmitted therefrom may (1) collide with signals from transmitter Tx2; or (2) avoid collision with signals from transmitter Tx2. The same possibilities exist from the perspective of transmitter Tx2. In a three channel system, three possibilities exist. Thus, signals transmitted from Tx1 may (1) neither collide with signals from Tx2 nor with signals from Tx3; (2) collide with signals from, at least, Tx2; and (3) collide with signals from, at least, Tx3. Similar possibilities exist from the perspectives of Tx2 and Tx3. When viewed in this manner, the number of collision possibilities implies the number of signal transmissions that should occur. Thus, a three-logical-channel system presents three collision possibilities, and this dictates that each message should be transmitted three times. This concept can be extended to include the general case of an n-channel simplex mode communication system. In the case of n-channels, each of n transmitters duplicates each signal n successive times. In such case, a set of n time-hopping schedules selected for the n-channel system guarantees that at least one duplication of each unique data message transmission is not collided with any other signals. Thus, at most, n−1 duplications are collided with other signals and lost.

Figure 3A:
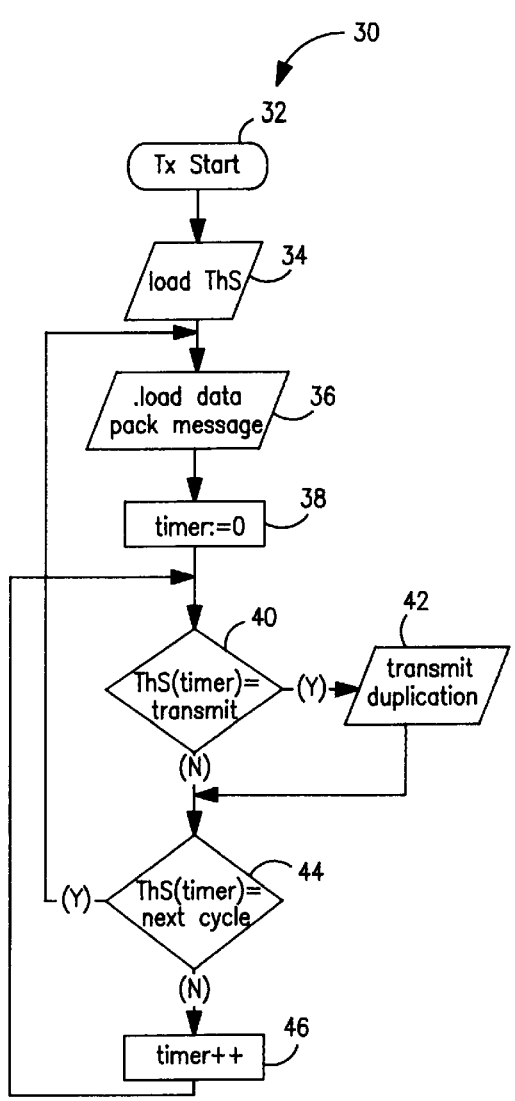
FIGS. 3a and 3b, respectively, illustrate the preferred algorithms followed by the transmitters and receivers of the system of FIG. 1 during operation thereof.

The sequence of operations executed by each of first and second transmitters Tx1 and Tx2 of FIG. 1 is illustrated in FIG. 3a. The flow chart 30 of FIG. 3a begins with transmitter start-up block 32. Once the transmitter has been activated, the transmitter proceeds to block 34 where the particular time-hopping schedule assigned to the transmitter is loaded for use. The transmitter then proceeds to block 36 where the particular input data to be transmitted is packed and encoded into the proper format (e.g., is associated with start-bits, a logical channel number, parity bits and stop-bits etc. and encoded) to form a data message. When the transmitter proceeds to block 38, a timer is reset to zero and the transmitter proceeds to block 40 where it is determined whether appropriate time for data message transmission has occurred. Restated, it is determined in block 40 whether an appropriate time for transmission according the assigned time-hopping schedule has been reached. If so, the transmitter proceeds to block 42 where the timer gate is opened for a predetermined period of time so that the data message may be transmitted. If not, the transmitter proceeds to block 44 where it is determined whether or not a new period of the time-hopping schedule has begun. If not, the transmitter proceeds to block 46 where the timer is increased and the transmitter proceeds back to block 40 where the procedure outlined immediately above is repeated until it is determined that a new period has begun. At this point, the transmitter returns to block 36 where data for another signal is properly encoded into a data message for subsequent transmission. The transmitter then cycles through the remainder of the flow chart 30 as described above until transmission is no longer desired.

Figure 3B:
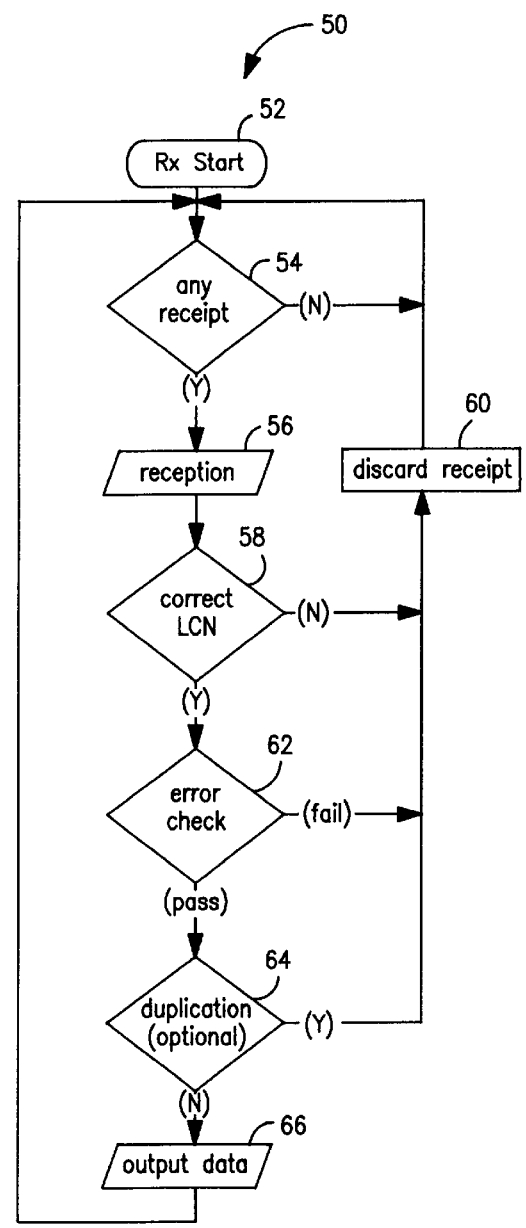

The preferred operating procedure for receivers Rx1 and Rx2 of the simplex mode communication system of FIG. 1 is indicated by flow chart 50 at FIG. 3b. Flow chart 50 begins at block 52 with activation of the receiver. The receiver then proceeds to block 54 where it is determined whether any data messages have been received. If not, the receiver continues to loop back to the beginning of block 54 until a data message is received. When this occurs, the receiver proceeds to blocks 56 and 58 where the received data message is unpacked and decoded so that the logical channel number can be determined and the input data extracted therefrom. If the logical channel number of the signal does not match the logical channel number of the receiver, the process passes through block 50 where the data message is discarded and the process repeats at block 54 as described immediately above. If the logical channel number does match the logical channel number of the receiver, the receiver proceeds to block 62 where it is determined whether signal collision has occurred as known in the art. If signal collision has occurred, the receiver discards the data message at block 60 and repeats the procedure beginning with block 54 as described above. If no signal collision has occurred, the receiver passes to block 64 where it is determined whether or not the properly received signal is a duplicate of an earlier signal. If so, the data message is discarded at block 60 and the receiver returns to block 54. If not, the receiver passes to block 66. Since the step of block 64 is a preferred option, it may or may not be implemented in any given system designed in accordance with the invention. At block 66, the receiver outputs the properly received input data and returns to block 54 to await the reception of additional data messages as described above.

Figure 4:
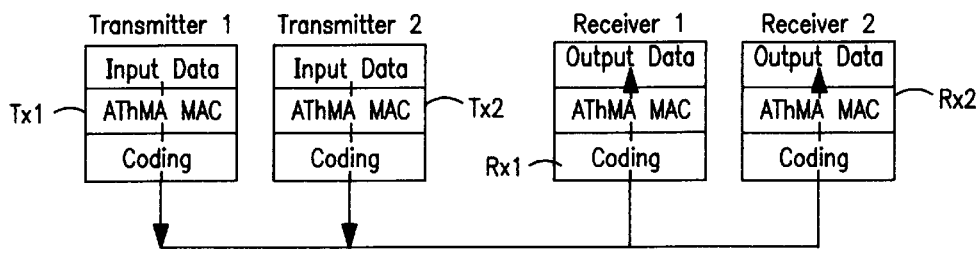
FIG. 4 illustrates the preferred topology of the ATHMA protocol employed by the system of FIG. 1.

The preferred topology for implementing the communication system of FIG. 1 is illustrated in FIG. 4. Those of ordinary skill in the art will readily appreciate that this figure depicts one topology for conventional asynchronous simplex mode communication systems except that the ATHMA protocol of the present invention has been utilized therein as described above.

Selection of the optimal time-hopping schedules for the transmitters of the simplex mode communication system of FIG. 1 will be illustrated with reference to FIGS. 5a–5h. One method of deriving the appropriate time-hopping schedules is through the use of a time domain boundary method ("TDBM") which results in the determination of three variables: (1) the number of channels to be multiplexed N; (2) the total variance of local time schedule σ; and (3) the burstiness B. Thus, the TDBM can be used to calculate a set of time-hopping schedules for transmitters utilizing different burstiness rates among the various transmitters, different message lengths among the various transmitters and varying burstiness rates and message lengths of a given transmitter over time. If the burstiness of the system and message length are fixed and known, the TDBM can be used to derive a set of time-hopping schedules which can provide for maximum throughput for any set of transmitter/receiver pairs. The example of FIGS. 5a–5h illustrates derivation of an optimal time-hopping schedule for a simplex communication system having two logical channels, such as the system of FIG. 1, in canonic terms. This is accomplished by calculating the earliest schedule for transmission events in the two channel system such that at least one duplicate message of each period and each logical channel is not collided with any messages from the other logical channel. Naturally, the principles illustrated in FIGS. 5a–5h can be used by any ordinary artisan to derive an optimal set of time-hopping schedules for a system having any number of logical channels.

The following conventions are used in deriving the canonic form of the time-hopping schedules for a two logical channel system (N=2) according to the TDBM:

Let the burstiness of the system=B;

Let the first logical channel number=LCN-1;

Let the second logical channel number=LCN-2;

Let the transmission rate for LCN-1=f($1\pm\sigma_{clk1}$);

Let the transmission rate for LCN-2=f($1\pm\sigma_{clk2}$);

Let the length of messages transmitted from LCN-1=1/($1\pm\sigma_{message1}$);

Let the length of messages transmitted from LCN-2=1/($1\pm\sigma_{message2}$);

Letσ=the total deviation from an ideal parameter which results in a change in transmission length (For example, carrier frequency drift can be accounted for using $\sigma_{clk}$. Also, where $\sigma_{message}$ represents a change in message length, systems which allow for varying message length, e.g. 14 to 18 bits, can be created. Strictly speaking, a two-logical-channel system which accounts for frequency drift and varying message length in each of the transmitters yields $\sigma_{clk1}$; $\sigma_{clk2}$; $\sigma_{message1}$; and $\sigma_{message2}$. In the preferred embodiment, however, we have let $\sigma_{clk1}=\sigma_{clk2}$, $\sigma_{message1}=\sigma_{message2}$ and σ represents the total variance caused by $\sigma_{message}$ and $\sigma_{clk}$ to simplify the analysis.); and Let p=(1+σ)/(1−σ), where p represents the longest possible message length of LCN-2 as seen by LCN-1 and the longest possible message length of LCN-1 as seen by LCN-2 (from the viewpoint of one logical channel, the schedule time and message length of the other logical channel has been taken as relative in order to derive time-hopping schedules which can accommodate a variety of transmission rates, message lengths, transmission periods, etc.; also 1/p=(1−σ)/(1+σ) represents the minimum message length). N and B can be any positive number but σ should be less than one, otherwise p could be negative or tend to infinity.

As shown in FIG. 5a the first step in developing an optimal set of time-hopping schedules in canonic form is to arbitrarily select LCN-1 as the first transmitting channel and to arbitrarily establish the time of initiation of the first transmission event as time [0]. From the perspective of LCN-1 the transmission length is one unit. Therefore, LCN-1's first transmission begins at time [0] and ends on time [1].

The beginning and end of LCN-2's first transmission is established as shown in FIG. 5b. This transmission must commence after LCN-1's first transmission ends, and preferably commences immediately after the first transmission of LCN-1 terminates. From the perspective of LCN-2 the maximum transmission length of all LCN-1 messages equals p. Therefore, the earliest opportunity for the first transmission of LCN-2 to begin without raising the possibility of signal collision is at time [p]. Further, since, from the perspective of LCN-2, the message length of LCN-2's first transmission is 1 time unit, the first transmission of LCN-2 terminates at time [p+1].

With reference now to FIG. 5c, the beginning and end of the second transmission of LCN-1 can be derived. At this point, time slots have been allocated for the first transmission of both LCN-1 and LCN-2. From the perspective of LCN-1, all LCN-1 transmissions are one unit in length and all LCN-2 transmissions are a maximum of p units in length. Accordingly, the first opportunity for the second transmission of LCN-1 to commence without raising the possibility of signal collision is at the termination of the first transmission of LCN-2, i.e. at time [1+p] from the perspective of LCN-1. The second transmission length is one unit, which necessarily implies that this transmission terminates at time [2+p].

The beginning and end of the second transmission of LCN-2 can be derived as shown in FIG. 5d. From the perspective of LCN-2 three transmission slots have been allocated, LCN-1 first and second transmissions and LCN-2 first transmission. Further, a maximum transmission length for all LCN-1 transmissions equals p and the transmission length of all LCN-2 messages equals 1. The earliest opportunity for the second transmission of LCN-2 to begin (while guaranteeing no signal collisions) is after termination of the first transmission of LCN-2 plus the time for two transmissions of LCN-1 to occur. Thus, in order to ensure that signal collision does not occur, a time interval at least equal to the time for transmitting two messages on LCN-1 (including an appropriate delay) must be able to fit between the first and second transmissions of LCN-2. This implies that the earliest opportunity to begin the second transmission of LCN-2 is at time [(p+1)+p(2+p)] or time [$p^2$+3p+1]. Naturally, this transmission terminates one time unit later, or at time [$p^2$+3p+2].

With reference now to FIG. 5e, the beginning of the next cycle of LCN-1 will be determined. From the perspective of LCN-1 four transmission slots have been allocated. These are LCN-1 first and second transmissions and LCN-2 first and second transmissions. Further, the maximum length of all LCN-2 transmissions equals p and the length of all LCN-1 transmissions equals 1. To avoid collisions, the earliest available opportunity to begin LCN-1's next possible transmission (the first transmission of the second period) is after the second transmission of LCN-1 has terminated and after a further delay equal to the time for transmitting two messages on LCN-2 (including an appropriate delay). This condition dictates that the beginning of LCN-1's second cycle can be no sooner than time $[(2+p)+p(p^2+2p+2)]$ or time $[2+3p+2p^2+p^3]$. With the transmission times for each period and the period length thus defined, LCN-1 can continue to transmit data messages according to this time-hopping schedule whenever and as long as desired. However, LCN-1 can repeat the above-noted sequence at any time in the future and does not need to repeat the sequence immediately.

The time for commencement of LCN-2's next possible transmission (the first transmission of the second period) can be derived in the manner shown in FIG. 5f. From the perspective of LCN-2 four transmissions have occurred. These are LCN-2 first and second transmissions and LCN-1 first and second transmissions. Naturally, the maximum length of all LCN-1 transmissions equals p and the length of all LCN-2 transmissions equals 1. The earliest opportunity to begin the next cycle of LCN-2 is upon termination of all prior transmissions plus a further delay equal to the time for transmitting two messages on LCN-2 (including an appropriate delay). Factoring in this delay yields the beginning of LCN-2's second cycle as time $[p(2+p)+(p^2+3p+2)]$ or time $[2+5p+2p^2]$. With the transmission times for each period and each period length thus defined, LCN-2 can continue to transmit data messages according to this time-hopping schedule whenever and as long as desired.

FIGS. 5g and 5h summarize the optimized time-hopping schedules for LCN-1 and LCN-2 as derived above.

The derived set of time-hopping schedules yields a maximum burstiness B of $1/(p^3+2p^2+3p+2)$. Conversely, the above set of time-hopping schedules could have been derived by starting with a burstiness B of $1/(p^3+2p^2+3p+2)$ and, e.g., by applying well known graphical analysis techniques.

It will be appreciated that the time-hopping schedules of FIGS. 5i and 5j represent modified versions of the schedules of FIGS. 5g and 5h. In particular, the schedules have been modified to remove the time delay of p from the schedule of LCN-2 and to extend the period of LCN-2 until it matches that of LCN-1. Thus, the schedules of FIGS. 5i and 5j are not optimized for maximum throughput. The modified schedules are depicted in FIGS. 5i and 5j for the purpose of comparison.

The time domain boundary method illustrated above can also be utilized to derive a set of time-hopping schedules for an n-channel ATHMA system. Restated, using the principals illustrated above, time-hopping schedules can be generated for the general case of an n-channel ATHMA system using only ordinary skill.

Figure 6:
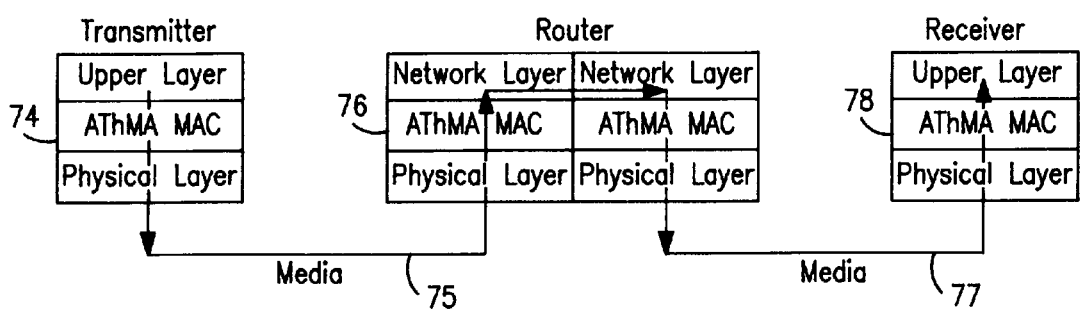
FIG. 6 illustrates an alternative system topology for a system utilizing the ATHMA protocol as a media access control ("MAC") protocol.

FIG. 6 shows the topology of a system which uses the ATHMA protocol of the present invention as a media access control (MAC) protocol in a system employing a message router. As shown therein a router 76 is utilized to coordinate the flow of information across transmission media 75 and 77. In this case, the data messages originate at transmitter 74 and are ultimately routed to receiver 78. With reference now to transmitter 74 data messages to be transmitted to receiver 78 originate with the upper layer of transmitter 74 and are appropriately packaged with the overheads as discussed above into an appropriate data message format at the ATHMA MAC layer. These messages are then sent to the coding layer or physical layer where the appropriate coding, for example Manchester coding, is implemented prior to transmission of the signal across transmission medium 75.

Upon reception of data messages at router 76, the bit streams are appropriately decoded at the physical layer, sent to the ATHMA MAC layer for unpacking and then delivered to the network layer for determination of where the data message should be delivered. Upon selecting the appropriate destination for the data message, a router 76 delivers the information to a subsequent ATHMA MAC layer for repacking and then to a subsequent coding layer for recoding. Thereafter, the data messages are sent over transmission medium 77 to receiver 78. At receiver 78, the information is decoded at the physical layer, unpacked at the ATHMA MAC layer and then outputted at the upper layer. Naturally, many variations to this basic topology will readily occur to those of ordinary skill in the art.

Figure 7:
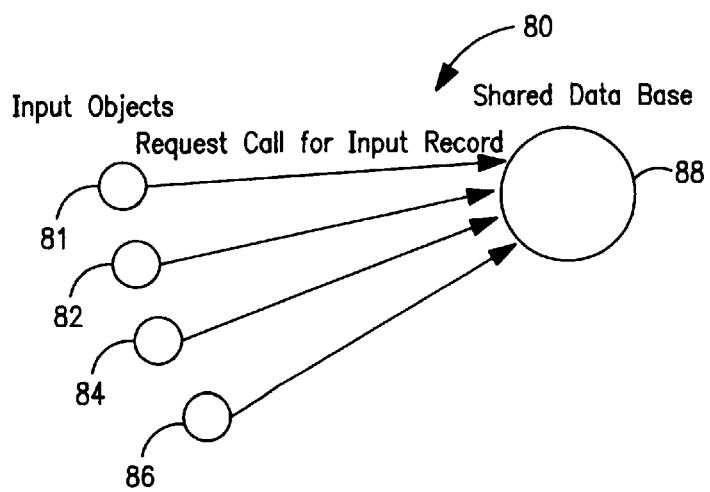
FIG. 7 illustrates one simple example of an application of the ATHMA protocol of the present invention in the form of a simple request protocol format.
Figure 2A:
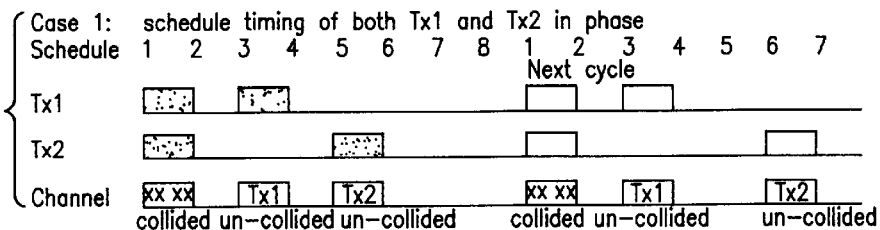
FIGS. 2a–2g illustrate various message transmission outcomes for the system of FIG. 1 using one possible set of normalized time-hopping schedules.
Figure 2B:
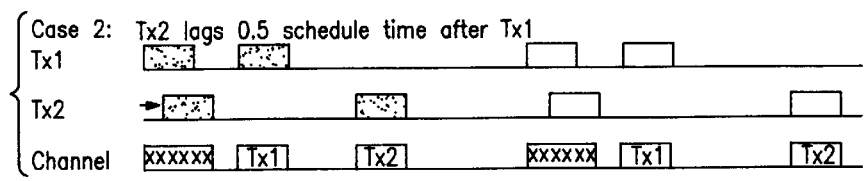
Figure 2C:
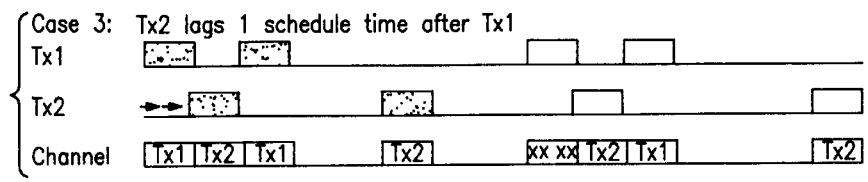
Figure 2D:
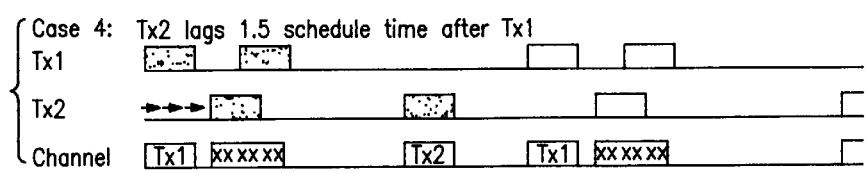
Figure 2E:
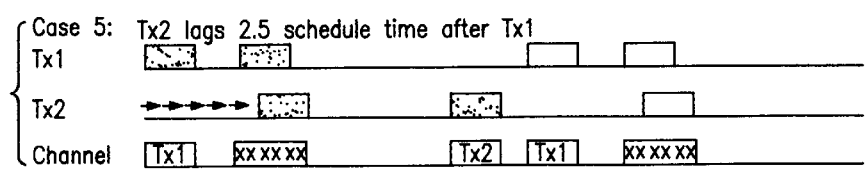
Figure 2F:
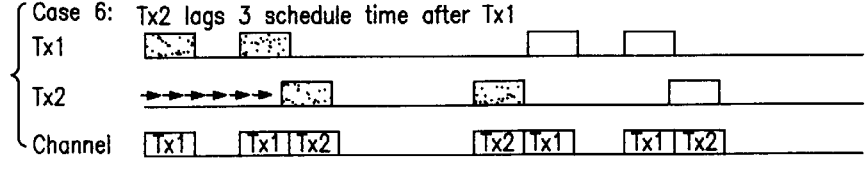
Figure 2G:
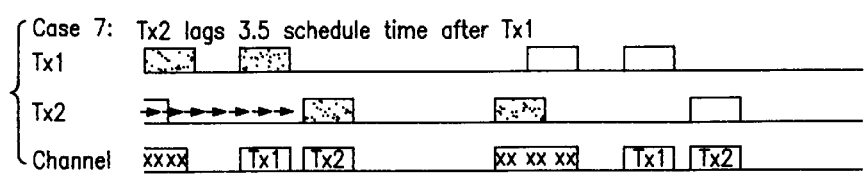

One simple model of a system utilizing the ATHMA protocol of the present invention as a request protocol is illustrated in FIG. 7. As shown therein the shared database system 80 includes a plurality of input objects 81, 82, 84 and 86 all of which are individually connected with a shared database 88. The system shown therein is preferably designed to record data transmitted from the input objects to the centralized database 88 utilizing "at-least-once" call semantics. Thus, at the start of an input event, an input object will generate a call to send data to database 88 according to an appropriate ATHMA time-hopping schedule. Upon receiving an uncollided call request, database 88 will record the transmitted data. Accordingly, in the system of FIG. 7, the concept of logical channels is replaced by the total processing time of the shared database and the concept a message is transformed into a process which occupies a given amount of processing time. Utilizing the ATHMA time-hopping schedule, the input objects 81, 82, 84 and 86 do not need to know whether the shared database 88 is busy at any given time. Nor do the input objects request permission to send calls to the shared database 88. Rather, shared database 88 will discard calls which collide in time and receive those that reach the database 88 intact. Since the input objects employ an appropriate ATHMA time-hopping schedule of the present invention, successful transmission of the calls for input records are guaranteed to the same extent that successful transmissions of messages is guaranteed in the other embodiments noted above.

While the present invention has been described in connection with what is presently considered to be the most practical and preferred embodiments, it is to be understood that the invention is not limited to the disclosed embodiment, but is intended to cover the various modifications and equivalent arrangements included within the spirit and scope of the appended claims.

What is claimed is:

1. An asynchronous time-hopping multiple access method for use with a simplex mode communications system of the type having at least first and second transmitters which are capable of transmitting messages over a single frequency channel independently of one another, the communication system also having first and second receivers which are capable of independently receiving the messages transmitted by said first and second transmitters and which each have an associated logical channel number, said method comprising the steps of:

inputting into the first and second transmitters, respective first and second data signals to be transmitted by the first and second transmitters;

packing the first and second data signals into a predetermined format having overhead codes including the respective logical channel numbers to thereby form respective first and second data messages to be transmitted by the first and second transmitters;

transmitting the first data message from the first transmitter in accordance with a predetermined first time-hopping schedule which dictates that the first data message be transmitted at least twice;

transmitting the second data message from the second transmitter in accordance with a predetermined second time-hopping schedule which dictates that the second data message be transmitted at least twice, wherein the first and second time-hopping schedules are coordinated to ensure that at least one transmission of each of the first and second data messages does not collide with any other transmissions of the first and second data messages;

receiving the transmitted first and second data messages at the first receiver, said step of receiving at the first receiver including:

determining whether any of the data messages received by the first receiver have collided with any of the other data messages;

determining which of the data messages received by the first receiver include a logical channel number matching the logical channel number associated with the first receiver; and extracting the data signals from the data messages received by the first receiver which have not collided with any of the other data messages and which include a logical channel number matching the logical channel number associated with the first receiver; and receiving the transmitted first and second data messages at the second receiver, said step of receiving at the second receiver including:

determining whether any of the data messages received by the second receiver have collided with any of the other data messages;

determining which of the data messages received by the second receiver include a logical channel number matching the logical channel number associated with the second receiver; and extracting the data signals from the data messages received by the second receiver which have not collided with any of the other received data messages and which include a logical channel number matching the logical channel number associated with the second receiver.

2. The method of claim 1, wherein said step of transmitting the first data message includes, transmitting the first data message two times within a time period of $[2+3p+2p^2+p^3]$, wherein p is the length of the second data message, wherein the first transmission of the first data message begins at time [0] and wherein the second transmission of the first data message begins at time $[1+p]$; and said step of transmitting the second data message includes, transmitting the second data message two times within a time period of $[2+5p+2p^2]$, wherein p is the length of the first data message, wherein the first transmission of the second data message begins at time [p] and wherein the second transmission of the second data message begins at time $[1+3p+p^2]$.

3. The method of claim 2, wherein said step of transmitting the first data message is repeated after time $[2+3p+2p^2+p^3]$ and wherein said step of transmitting the second data message is repeated after time $[2+5p+2p^2]$.

4. A simplex mode communication system utilizing an asynchronous time-hopping multiple access protocol for transferring data from a plurality of transmitters to at least one receiver, said system comprising:

a first transmitter for transmitting data massages at least in duplicate according to a first time-hopping schedule wherein all of the data messages transmitted by said first transmitter include logical channel data associated with said first transmitter;

a second transmitter for transmitting data messages at least in duplicate according to a second time-hopping schedule, wherein the first and second time-hopping schedules are coordinated to ensure that at least one of each duplicate data message transmitted by said first transmitter does not collide with any data messages transmitted by said second transmitter and that at least one of each duplicate data message transmitted by said second transmitter does not collide with any data messages transmitted by said first transmitter, wherein said first and second transmitters operate independently of one another, and wherein the data messages transmitted by said second transmitter include logical channel data associated with the second transmitter;

a first receiver for receiving data messages transmitted by at least one of said first and second transmitters, said first receiver including logical channel data associated therewith and being responsive to data messages which include logical channel data matching the logical channel data associated with said first receiver, said first receiver discarding collided data messages and being responsive to non-collided data messages such that at least some of the non-collided data messages are utilized by the first receiver in a predetermined manner; and a second receiver for receiving data transmitted by at least one of said first and second transmitters, said second receiver having logical channel data associated therewith and being responsive to non-collided data messages which include logical channel data matching the logical channel data associated with said second receiver such that the non-collided data messages are utilized by said second receiver in a predetermined manner.

5. An asynchronous time hopping multiple-access communication method for use with a simplex mode communication system of the type having n transmitters which are capable of transmitting messages over a single frequency channel independently of one another, and at least one receiver which is capable of receiving the messages transmitted by the n transmitters, each of the n transmitters having an associated logical channel number, said method comprising the steps of:

inputting into the n transmitters, respective n data signals to be transmitted by the n transmitters;

packing the n data signals into a predetermined format having overhead codes including respective the logical channel numbers to thereby form respective n data messages to be transmitted by the n transmitters;

transmitting the n data messages from the n transmitters in accordance with a predetermined set of n time-hopping schedules which dictate that each of the n transmitters transmits its respective data message n times such that at least one transmission of each of the n data messages does not collide with any other transmissions of the n data messages; and receiving the transmitted n data messages at the receiver, said step of receiving including:

determining whether any of the data messages received by the first receiver have collided with any of the other transmitted data messages;

determining the logical channel number of at least some of the non-collided data messages received by the receivers; and utilizing the data signals from the received data messages which have not collided with any of the other data messages and which have logical channel members which match respective channel members of the receivers in a predetermined manner.

6. A simplex mode communication system utilizing an asynchronous time-hopping multiple access protocol for transferring data from a plurality of transmitters to at least one receiver, said system comprising:

a first transmitter for transmitting data massages at least in duplicate according to a first time-hopping schedule wherein all of the data messages transmitted by said first transmitter include logical channel data associated with said first transmitter;

a second transmitter for transmitting data messages at least in duplicate according to a second time-hopping schedule, wherein the first and second time-hopping schedules are coordinated to ensure that at least one of each duplicate data message transmitted by said first transmitter does not collide with any data messages transmitted by said second transmitter and that at least one of each duplicate data message transmitted by said second transmitter does not collide with any data messages transmitted by said first transmitter, wherein said first and second transmitters operate independently of one another, and wherein the data messages transmitted by said second transmitter include logical channel data associated with the second transmitter;

a first receiver for receiving data messages transmitted by at least one of said first and second transmitters, said first receiver comprising:

means for determining whether any of the data messages received by said first receiver have collided with any of the other data messages, means for determining which of the data messages received by said first receiver include logical channel data matching the logical channel data associated with said first receiver, and means for outputting the data signals from the data messages received by said first receiver which have not collided with any of the other data messages and which include logical channel data matching the logical channel data associated with said first receiver, said first receiver discarding collided data messages and being responsive to non-collided data messages such that at least some of the non-collided data messages are utilized by the first receiver in a predetermined manner; and a second receiver for receiving data transmitted by at least one of said first and second transmitters, wherein said second receiver includes:

means for determining whether any of the data messages received by said second receiver have collided with any of the other data messages, means for determining which of the data messages received by said second receiver include logical channel data matching the logical channel data associated with said second receiver, and means for outputting the data signals from the data messages received by said second receiver which have not collided with any of the other received data messages and which include logical channel data matching the logical channel data associated with said second receiver.

* * * * *